(No Model.)
A. ALLSTÄDT.
HAT MEASURING APPARATUS.
No. 530,673. Patented Dec. 11, 1894.
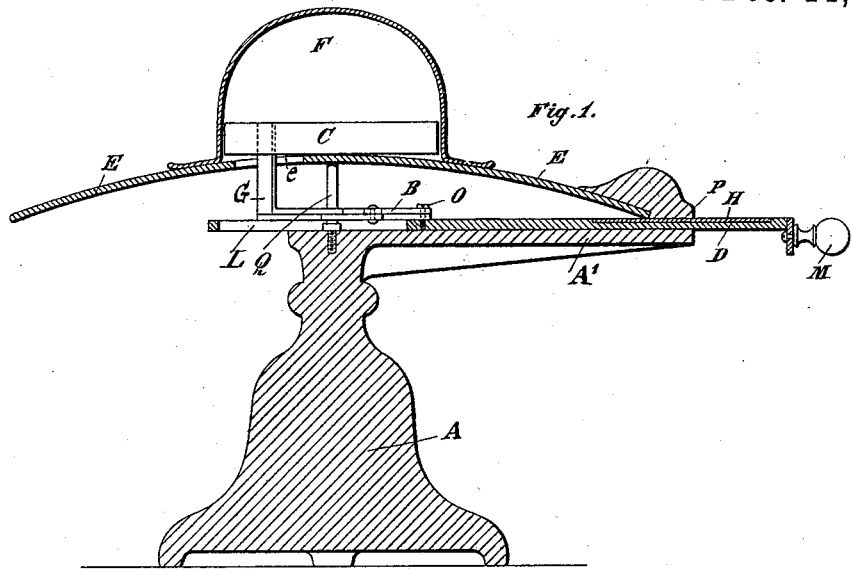
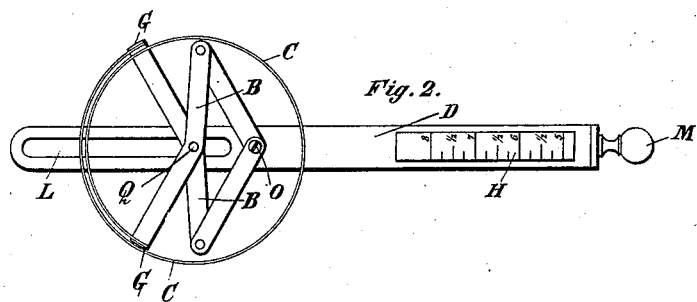
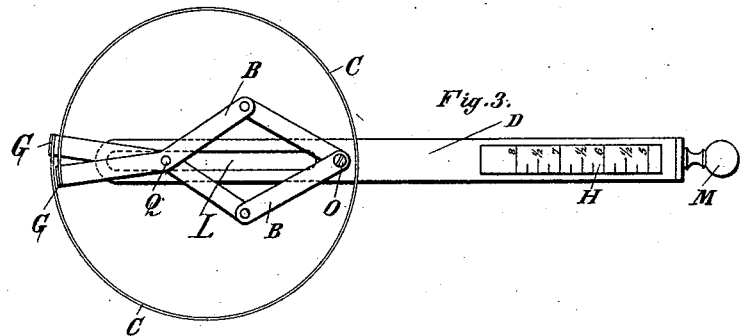
WITNESSES:
Marion Hall
Geo. L. Wheelock
INVENTOR
August Allstädt
BY
Gorme & Raegener
ATTORNEYS.

UNITED STATES PATENT OFFICE.

AUGUST ALLSTÄDT, OF HEIDELBERG, GERMANY.

HAT-MEASURING APPARATUS.

SPECIFICATION forming part of Letters Patent No. 530,673, dated December 11, 1894.

Application filed July 18, 1894. Serial No. 517,850. (No model.)

*To all whom it may concern:*

Be it known that I, AUGUST ALLSTÄDT, a citizen of the Empire of Germany, residing at Heidelberg, in the Grand Duchy of Baden, Germany, have invented certain new and useful Improvements in Hat-Measuring Apparatus, of which the following is a specification.

The object of this invention is to furnish a simple device for measuring the size of hats, the device consisting of a steel band, which is readily extended so as to fit snugly into the inner circumference of the hat, so that thereby the size of the hat can be readily determined; and the invention consists of a device for measuring the size of hats, which comprises a supporting-stand, a horizontal slide-rod guided in the upper part of said stand, a lazy-tong, one pivot of which is attached to the slide-rod and another pivot to the stand, two arms of said lazy-tong being connected to an extensible circular steel band, which is adapted to be inserted into the hat, and a concavo-convex plate, having an opening for the supporting arms of the measuring steel band, on which plate the hats are supported, so that the sizes can be measured, as will be fully described hereinafter and finally pointed out in the claims.

In the accompanying drawings, Figure 1 represents a vertical longitudinal section of my improved apparatus for measuring the size of hats. Fig. 2 is a plan view of the same, showing the measuring steel band, lazy-tong and slide-rod without the supporting-stand and hat-supporting plate, and Fig. 3 is a plan view of the same device, showing the steel band in extended position.

Similar letters of reference indicate corresponding parts.

Referring to the drawings, A represents a supporting-stand, which is provided with a horizontal bracket-arm A', on which is guided in suitable ways a slide-rod D, which is provided at its outer end with a knob M, at the opposite end with a slot L, and near the knob with a scale H, which is graduated according to the different sizes of the hats. To the slotted end of the slide-rod D is applied the pivot O of a lazy-tong B, the second pivot of which is firmly secured to the center of the stand A, so that the slot L of the slide-rod is guided along the pivot Q, when the slide-rod is moved in one or the opposite direction. The ends of the lazy-tong B are provided with upright arms G, to which the opposite ends of a circular steel band C are attached. Into a recess of the horizontal bracket-arm A' is attached a convex plate E, which serves to support the hat F, the size of which is to be measured. The convex plate E is preferably made of sheet metal and provided with an opening *e* of sufficient size to provide for the free movement of the arms G. An index P at the end of the horizontal bracket arm A' indicates on the scale H the size of the hat to be measured. The pivot Q is extended in upward direction so as to form a support for the center of the convex supporting-plate E and retain thereby the steady position of the same.

When it is desired to measure the size of the hat, the same is placed on the supporting-plate E, the slide-rod D then taken hold of at its knob end and slowly moved in outward direction in the ways of the supporting-bracket arm A'. By the outward motion of the slide-rod D, the lazy-tong is extended and the upright arms of the same are moved toward each other, so that the band is extended and enlarged as shown in Fig. 3, until the same fits snugly into the interior circumference of the hat. At the same time, the size of the hat is read off by the position of the indicator P on the scale H. As the measuring steel band is held at tension by the slide rod, it will, as soon as the knob M is released, immediately return into its initial position, as shown in Fig. 2, in which the ends of the steel band are made to overlap each other, so that the diameter of the same is considerably diminished.

The measuring device described forms a very simple means by which the size of hats can be measured, the device forming also, with suitable ornamentation, a very ornamental implement for hat-stores, by which almost immediately the size of the hat which any customer wears can be quickly and conveniently determined and a new hat of the same size selected for him.

Having thus described my invention, I claim as new and desire to secure by Letters Patent—

1. A device for measuring the size of hats, which comprises a supporting-stand, a slide-rod guided in the same, a lazy-tong, one pivot of which is connected to the slide-rod and the other pivot to the stand, and a measuring band attached to the free ends of the lazy-tong, substantially as set forth.

2. A device for measuring the size of hats, which comprises a supporting-stand, having a horizontal bracket-arm, a slide-rod guided on said bracket-arm and provided with a slotted end, a lazy-tong, one pivot of which is attached to said slide-rod and the other pivot of which is attached to the stand and passes through said slot, an extensible measuring band, the ends of which are attached to the free ends of the lazy-tong, and a convex supporting-plate attached to the bracket-arm, substantially as set forth.

3. A device for measuring the size of hats, which comprises a supporting-stand, having a horizontal bracket-arm, a slide-rod guided on said arm and provided with a scale at one end and a slot at the other end, a lazy-tong, one pivot of which is attached to the slide-rod, while the other pivot is attached to the stand and passes through said slot, a measuring band, the ends of which are attached to the free ends of said lazy-tong, and a convex supporting-plate attached to said bracket-arm, below the band, and resting on the center pivot of the stand, said convex plate being provided with an opening for the supporting-arms of the steel band, substantially as set forth.

In witness whereof I hereunto set my hand in presence of two witnesses.

AUGUST ALLSTÄDT.

Witnesses:
HECTOR LOEB,
F. ENGLER.